Dec. 10, 1929.　　　　B. P. GRAVES　　　　1,738,646
COOLANT SUPPLY FOR MILLING MACHINES
Filed March 30, 1926　　　3 Sheets-Sheet 1
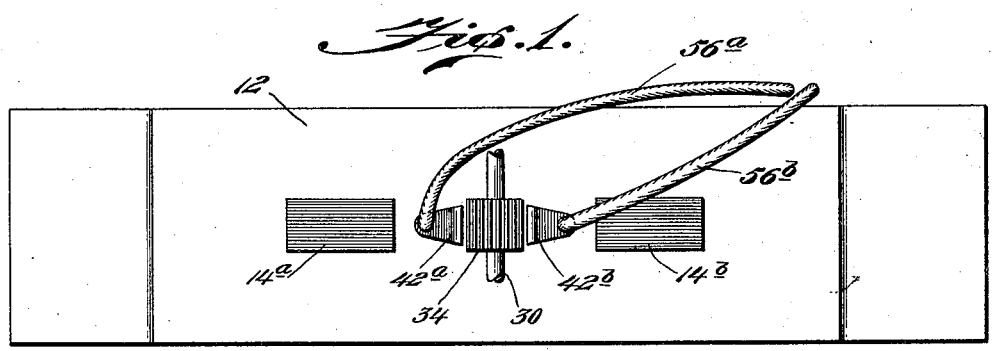
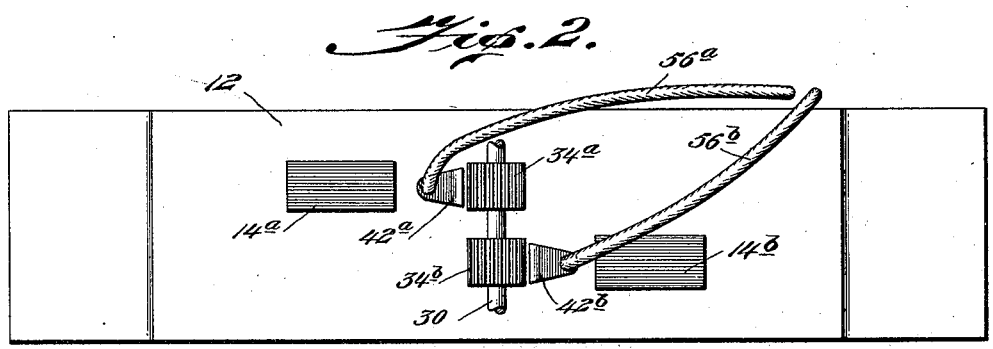
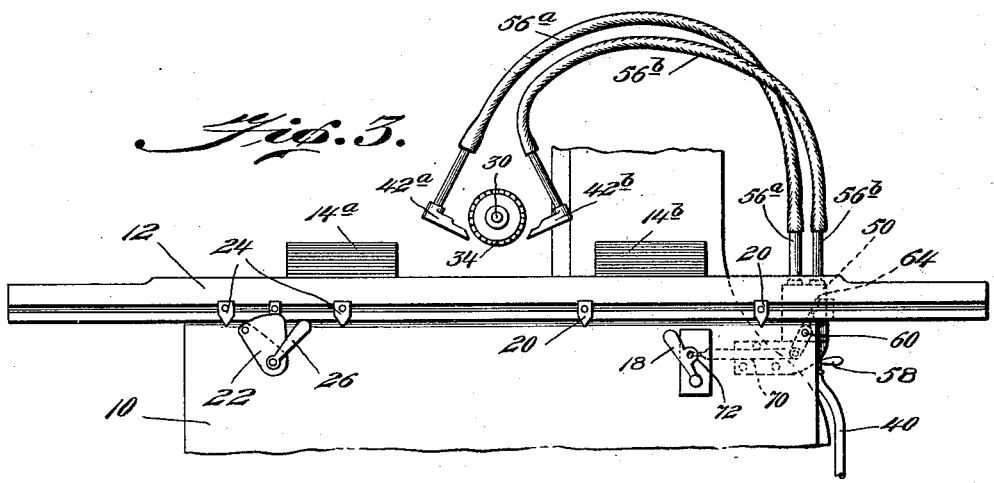
Inventor
Benjamin P. Graves
By Thomas A. Jenckes Jr.
Attorney

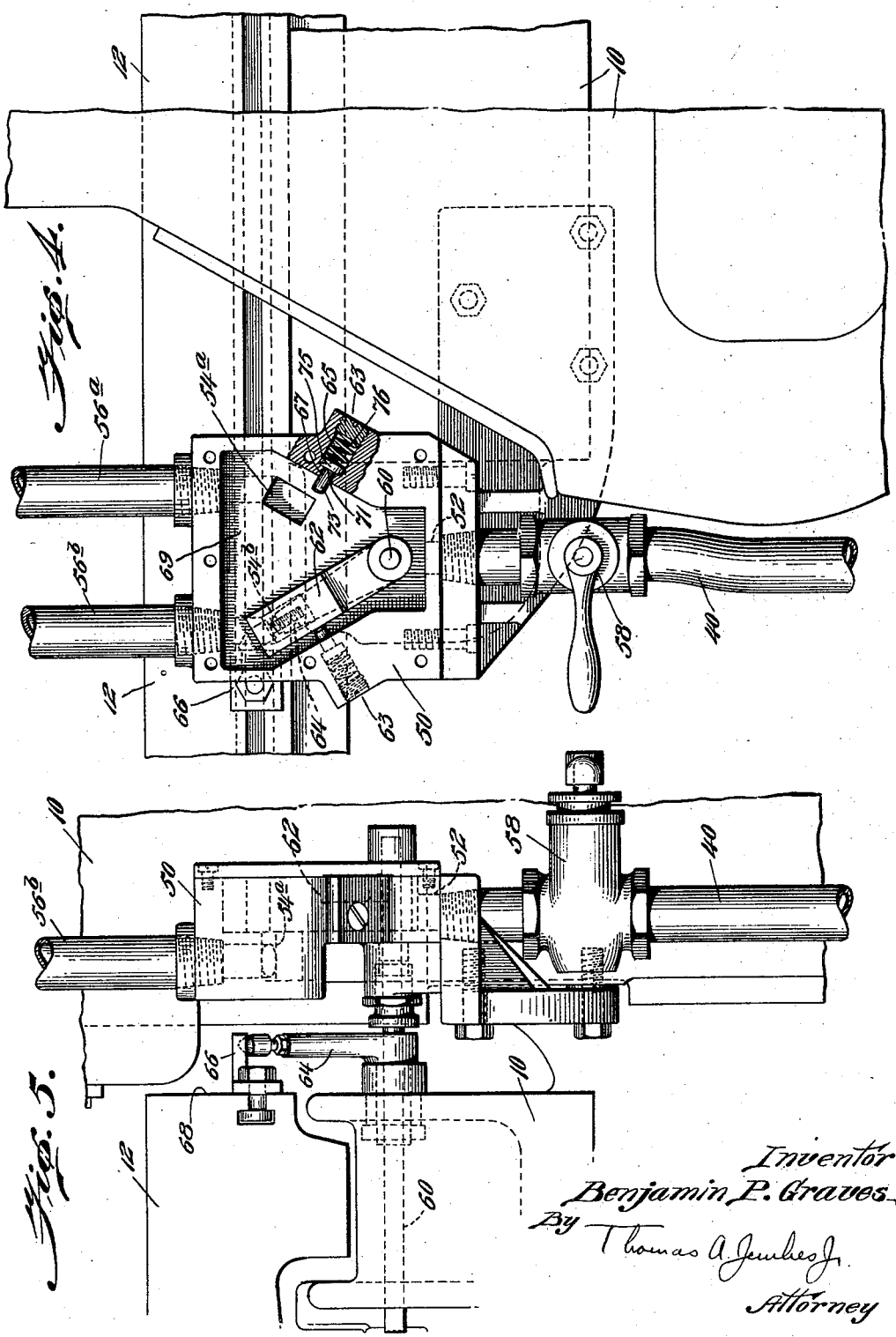

Inventor
Benjamin P. Graves
By Thomas A. Jenckes Jr.
Attorney

Patented Dec. 10, 1929

1,738,646

UNITED STATES PATENT OFFICE

BENJAMIN P. GRAVES, OF CRANSTON, RHODE ISLAND, ASSIGNOR TO BROWN AND SHARPE MANUFACTURING COMPANY, OF PROVIDENCE, RHODE ISLAND, A CORPORATION OF RHODE ISLAND

COOLANT SUPPLY FOR MILLING MACHINES

Application filed March 30, 1926. Serial No. 98,500.

My invention relates to cutting machines and specifically comprises the provision of means to supply a coolant to the respective cutting edge of a rotary cutting means on a reciprocating piece of work while said cutting means and work are in relative cutting relation only and for shutting off the supply of coolant when they are not at other desired portions of the reciprocating cycle of said work.

My invention is specifically adapted for use on the type of milling machine which employs a rotary cutter and has the work mounted on a reciprocating work support adapted to advance the work up to said cutting means and past said cutting means in cutting relation thereto and on reversal to return said work to its original position. In machines of this description the coolant is normally discharged at an angle against the cut of the rotary cutting means on the work and it is only during a small portion of the reciprocating cycle that the work is in contact with the rotary cutting means. The main object of my invention, therefore, is to completely shut off the supply of coolant at all times when it is not actually needed in the cutting operation in machines of this description, as shown in my specific embodiment, except during the cutting stroke of a reciprocating work support. So far as my invention is concerned, it includes various common types of milling machines. For instance, the type where only one piece of work is reciprocated and the cutter normally revolves to cut in one direction and where the coolant is normally supplied from one side only. This is the type of milling described as automatic milling in Patent No. 1,355,167, issued October 12, 1920 to Charles A. Rich for a milling machine, reference to which is hereby made for details of the specific milling machine shown. My invention may also be employed on the type of milling machines capable of doing intermittent milling as described in said patent. Moreover, my invention is peculiarly adapted, as shown in the preferred embodiment, for use in a milling machine capable of doing continuous milling, as described in said patent, that is, where a piece of work is milled during the travel of the support in each direction and the operator removes a finished piece from each end of the support and replaces it with another while a piece of work at the other end of the support is being milled. Where a piece of work is milled on each stroke of the support, it is obvious that it is then necessary to supply a coolant discharging means to discharge the coolant on the side of the rotary cutting means against the work, thus as shown in my preferred embodiment on each side of said rotary cutting means and to alternately shut off the supply of coolant to each respective piece of work while it is not being cut. It is obvious that in this type of milling, either a single cutter may be employed for the oppositely disposed pieces of work or an individual cutter for each piece of work.

As a result of shutting off the supply of coolant except when it is actually needed during the cutting operation, it is obvious that I have not only saved a large amount of coolant, but that I also have made working conditions free from an unnecessary amount of lubricant,—cleaner and much more pleasant for the operator.

These and such other objects of my invention as may hereinafter appear will be best understood from a description of various embodiments thereof such as are shown in the accompanying drawings.

In the drawings, Fig. 1 is a diagrammatic plan view of a milling machine adapted for "continuous" milling, employing a single cutter with my invention attached.

Fig. 2 is a diagrammatic plan view of a milling machine also adapted for "continuous" milling, but employing an individual cutter for each piece of work, with my invention attached.

Fig. 3 is a front elevation of the embodiment shown in Fig. 1.

Fig. 4 is a rear view of a portion of the rear of the milling machine, showing in detail the two-way valve I employ for reversing the flow of coolant to the respective coolant discharging means with the cover plate thereof removed.

Fig. 5 is a side elevation of a portion of the rear end of a milling machine also illustrating the two-way valve and the actuating mechanism therefor which I preferably employ.

Figure 6:
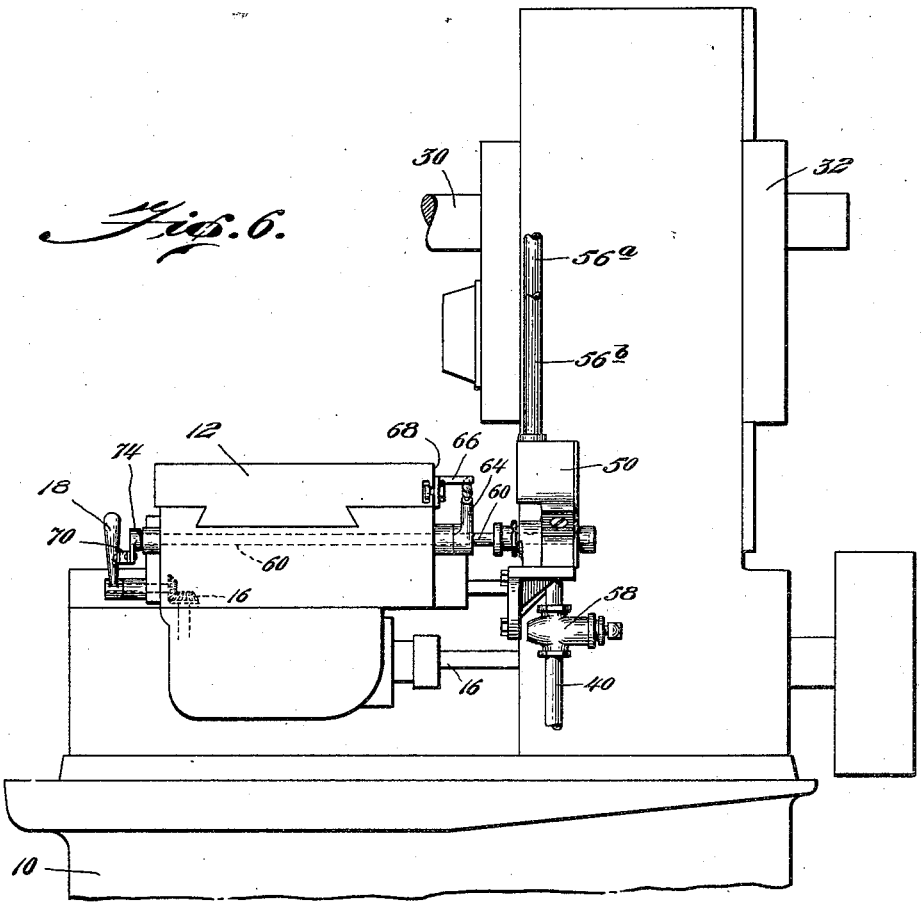
Fig. 6 is a diagrammatic side elevation of a milling machine illustrating not only the two-way valve and the automatic actuating mechanism thereof automatically actuated by the movement of the support, but also the manually controlled means I preferably employ to independently control the coolant supply.
Figure 7:
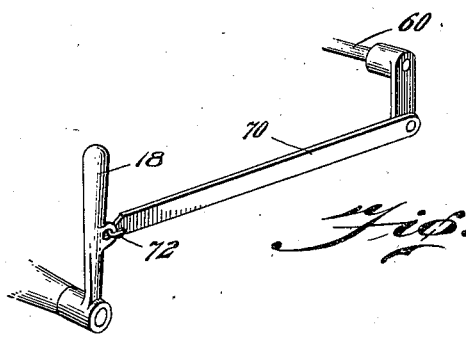
Fig. 7 is a detailed view of the link I preferably employ for detachably connecting the manually controlled means to control the movement of the support and the two-way valve actuating means.

In the drawings, wherein like characters of reference indicate like parts throughout, 10 generally indicates the frame of a milling machine of a type having the travelling work support or table 12 adapted to reciprocate thereon. As stated, for details of construction of the particular machine shown, reference is hereby made to Patent No. 1,355,167 granted October 12, 1920 to Charles A. Rich. Said work support 12 is adapted to have the work clamped thereon preferably adjacent to one end thereof, and where said machine is adapted to be used for "continuous" milling, two or more pieces of work 14$^a$ and 14$^b$ are clamped to said support on opposite ends thereof. The support 12 is reciprocated by the usual mechanism and gearing 16 in the usual fashion as fully described in said Patent No. 1,355,167. Said reciprocating mechanism 16 is controlled as usual either by means of the hand lever 18 or automatically by means of the dogs 20 on the front edge of said reciprocating work support 12. The milling machine may also be provided with the fast and slow speed control mechanism 22, either automatically controlled through the medium of the dogs 24 or manually through the medium of the hand lever 26 as shown in said patent. Said machine is also provided with the rotary spindle 30 adapted to be revolved if desired alternately in either direction by the mechanism 32 explained in detail in said patent. Said rotary spindle is provided with the rotary cutting means 34 which may comprise either the single cutter 34 shown in Fig. 1 or the plurality of cutters 34$^a$ and 34$^b$ shown in Fig. 2, one for each respective piece of work 14$^a$ and 14$^b$.

It is obvious that said milling machine operates either through the medium of the hand control or the automatic control referred to, to advance the work 14 up to its respective cutting means 34 and past said cutting means 34 in cutting relation thereto and to automatically or manually reverse and return the work to its original position, and that in the specific embodiment of milling machine shown the movement of the work support 12 in one direction functions as a cutting stroke for the work 14$^a$ and a reverse stroke for the work 14$^b$, whereas the movement of the table in the opposite direction functions as a cutting stroke for the work 14$^b$ and as a reverse stroke for the work 14$^a$.

As stated, my invention specifically relates to the means to supply a coolant to the cutting edge of said cutting means 34 against the work 14 during the cutting operation only and to shut it off at other times, thus in my preferred embodiment to turn on the coolant during the respective cutting stroke and to shut it off during its respective reverse stroke. To these ends, I provide the coolant supply line 40 leading from the usual coolant supply reservoir (not shown) and I suitably mount means, or as shown in my preferred embodiment, a plurality of means 42, preferably mounted on each side of said cutting means 34, to discharge the coolant to the desired cutting edge of said cutting means 34 against the work. In my preferred embodiment, said means 42 comprise the flat nozzles 42$^a$ and 42$^b$ of a width approximately equal to that of the cutter 34, preferably angularly disposed relative to the cutting edge of said cutting means 34 to discharge a coolant in a flat sheet against the respective cutting edge of said means against the work. I also provide means connecting said coolant supply line 40 with each respective coolant discharging means 42$^a$ and 42$^b$. In my preferred embodiment, said means includes the two-way valve 50, suitably connected by means of the orifice 52 to the coolant supply line 40 and having the discharge ports 54$^a$ and 54$^b$ each adapted to be connected respectively to the respective coolant discharging means 42$^a$ and 42$^b$ by the respective pipes 56$^a$ and 56$^b$. The coolant supply line 40 may be provided with a manually operative shut-off valve 58 to completely shut off the flow of coolant through said line 40.

I provide means controlled by the movement of said work support 12 to actuate said two-way valve 50 to alternately connect the proper coolant discharging means 42$^a$ and 42$^b$ with said coolant supply line 40 to supply the coolant to the then relative cutting edge of said cutting means 34 against its respective piece of work 14$^a$ or 14$^b$ during the cutting operation. To accomplish this in my preferred embodiment, I pivotally secure the shaft 60 transversely of said machine in suitable bearings in said valve 50 and in the frame 10 of said machine, said shaft 60 preferably terminating within the valve 50 and having its opposite end terminating on the front of the machine. To alternately close the ports 54$^a$ and 54$^b$ of said valve, I provide the closure arm 62, suitably pivoted to said shaft 60 within the chamber 69 of said valve 50. It is thus obvious that said closure arm 62 on respective pivoting movement thereof is adapted to alternately open and close the respective coolant discharging means connecting orifices 54$^a$ and 54$^b$ of said two-way valve 50. I secure to said shaft 60 at a point adjacent to the rear edge of the travelling work support 12 the operating lever 64, the upper end thereof extending adjacent to the rear edge of said travelling work support. To automatically actuate said operating lever, I provide the rearwardly projecting dogs 66 horizontally adjustable on the rear edge 68 of said work support 12. It is thus obvious that as said dogs 66 contact said operating lever 64 that they will pivot said operating lever 64 to pivot said shaft 60 to swing said closure arm 62 from closure of the orifice 54$^b$ to closure of the orifice 54$^a$ and vice versa as contacted by the dogs 66 in the reciprocating cycle of said support 12 to alternately connect the proper coolant discharging means 42$^a$ or 42$^b$ with said coolant supply line 40 to supply coolant from the then relative cutting edge of said cutting means 42 against the work during the cutting operation of said cutting means on its respective piece of work 14$^a$ or 14$^b$. It is obvious that as the dogs 66 are horizontally adjustable on the rear edge 68 of said reciprocating work support 12, that they may be adjusted to move the closure arm 62 from covering up the orifice 54$^a$ or the orifice 54$^b$ at any desired periods of the reciprocating cycle of the support 12. In case it may be desired to employ the apparatus hitherto explained for automatic milling or intermittent milling on a single piece of work or otherwise, either the orifice 54$^a$ or the orifice 54$^b$ may be suitably plugged to completely shut off the supply of coolant during the entire portion or part of either the cutting or reverse strokes of said support 12 or a valve may be inserted in said lines 56$^a$ or 56$^b$ for this purpose.

As stated, the type of machine shown in my preferred embodiments is also preferably provided with the manually controlled means 18 to independently control the movement of the table. In my preferred embodiment, to provide means controlled by said manually controlled means to independently control the supply of coolant, I provide the link 70 pivotally attached to the front end 74 of said shaft 60 and adapted to be detachably secured to said means 18 by means of the hook mechanism 72. It is thus obvious that if it is desired to manually control the supply of coolant in conjunction with the manual control and movement of said support 12, that it is merely necessary to detachably secure the end of the link 70 to said operating handle 18.

In my preferred embodiment to cushion the shock of pivoting movement of the closure arm 62, I preferably provide the cushioning devices 63 mounted in each side wall of said two-way valve 50. I provide the cylinders 65 in each opposite side wall of said valve 50 having the openings 67 of smaller diameter extending into the valve chamber 69. I also provide the plungers 71 having the stems 73 thereof projecting into said chamber 69 through said openings 67 and the heads 75 resting on springs 76 secured within said cylinders 65. It is thus obvious that as said plungers 73 are alternately struck by the closure arm 62, which is moved as explained, by the dogs 66 contacting the operating lever 64, that said plungers 71 are depressed in the cylinders 65 against the pressure of the springs 76 to permit the dogs 66 to pass by the operating lever 64. It is obvious, however, that when the pressure on the operating lever 64 is released that the springs 76 will immediately function to raise up said plungers 71 to raise up said closure arm 62 to raise up the operating lever 64 in the path of the dogs 66 on the next stroke of the support. Thus the devices 63 function not only as cushioning devices but also as means to raise up the operating lever 64 in the path of the dogs 66.

Though I have shown my invention specifically adapted for use in a milling machine, it is obvious that it may be used in any type of a cutting machine wherein it is desired to supply the coolant against the work.

It is obvious that employing my invention, a great saving is made in coolant used, that the operating conditions are made much more attractive to the workman and that the entire machine is cleaner than hitherto.

It is obvious that in place of one piece of work, or one piece of work on each end of the support, a plurality of pieces of work may be so mounted and I therefore in the claims employ the phrase "a piece of work" to include the plural thereof if desired. I employ the word "end" when referring to the reciprocating support 12 as including all portions on either side of the center line thereof.

It is understood that my invention is not limited to the specific embodiments shown or methods described and that various deviations may be made therefrom without departing from the spirit and scope of the appended claims.

What I claim as new and desire to secure by Letters Patent is:

1. In a machine, in combination, rotary cutting means mounted thereon, a reciprocating work support mounted thereon adapted to hold pieces of work on opposite ends thereof and to advance them alternately into operative cutting relation to said cutting means, means to change the direction of travel of said support, a plurality of means to supply a coolant to the cutting edge of said means against the work and means controlled by the movement of the support to alternately supply said coolant to the desired relative cutting side of said cutting means and to shut off the supply of coolant from the opposite side as desired.

2. In a machine, in combination, rotary cutting means mounted thereon, a reciprocating work support mounted thereon adapted to hold pieces of work on opposite ends thereof and to advance them alternately into operative cutting relation to said cutting means, means to change the direction of travel of said support, a plurality of means on opposite sides of said cutting means to supply a coolant to the cutting edge of said means against the work and means controlled by the movement of the support to supply coolant alternately at opposite sides of said cutting means at desired predetermined portions of the reciprocating cycle.

3. In a machine, in combination, rotary cutting means mounted thereon, a reciprocating work support mounted thereon adapted to hold pieces of work on opposite ends thereof and to advance them alternately into operative cutting relation to said cutting means, means to automatically change the direction of travel of said support, a plurality of means to supply a coolant to the cutting edge of said means against the work and means controlled by the movement of the support to automatically alternately supply said coolant to the desired relative cutting side of said cutting means and to automatically shut off the supply of coolant from the opposite side as desired.

4. In a machine, in combination, rotary cutting means mounted thereon, a reciprocating work support mounted thereon adapted to hold pieces of work on opposite ends thereof and to advance them alternately into operative cutting relation to said cutting means, means to automatically change the direction of travel of said support, a plurality of means on opposite sides of said cutting means to supply a coolant to the cutting edge of said means against the work and means controlled by the movement of the support to automatically supply coolant alternately at opposite sides of said cutting means at desired predetermined portions of the reciprocating cycle.

5. In a machine, in combination, rotary cutting means mounted thereon, a reciprocating work support mounted thereon adapted to hold pieces of work on opposite ends thereof and to advance them alternately into operative cutting relation to said cutting means, means to automatically change the direction of travel of said support, a plurality of means to supply a coolant to the cutting edge of said means against the work and means controlled by the movement of the support to alternately automatically supply said coolant to the desired relative cutting side of said cutting means and to automatically shut off the supply of coolant from the opposite side as desired, manually controlled means to independently control the movement of said support and means controlled by said means to independently control the supply of coolant.

6. In a machine, in combination, rotary cutting means mounted thereon, a reciprocating work support mounted thereon adapted to hold pieces of work on opposite ends thereof and to advance them alternately into operative cutting relation to said cutting means, means to automatically change the direction of travel of said support, a plurality of means on opposite sides of said cutting means to supply a coolant to the cutting edge of said means against the work and means controlled by the movement of the support alternately to automatically supply coolant at opposite sides of said cutting means at desired predetermined portions of the reciprocating cycle, manually controlled means to independently control the movement of said support and means controlled by said means to independently control the supply of coolant.

7. In a machine, in combination, rotary cutting means mounted thereon, a reciprocating work support mounted thereon adapted to hold pieces of work on opposite ends thereof and to advance the piece on each respective end thereof alternately into operative cutting relation to said cutting means, means to change the direction of travel of said support, a plurality of means to discharge a coolant to the cutting edge of said means against the work, a coolant supply reservoir, means connecting said supply reservoir to each respective coolant discharging means including a two-way valve and means controlled by the movement of said support to actuate said two-way valve to alternately connect the proper coolant discharging means with said reservoir to supply coolant to the desired cutting edge of said cutting means against the work during the cutting operation.

8. In a machine, in combination, rotary cutting means mounted thereon, a reciprocating work support mounted thereon adapted to hold pieces of work on opposite ends thereof and to advance the piece of work on each respective end thereof alternately into operative cutting relation to said cutting means, means to automatically change the direction of travel of said support, a plurality of means to discharge a coolant on the cutting edge of said means against the work, a coolant supply reservoir, means connecting said supply reservoir to each respective coolant discharging means including a two-way valve, means controlled by the movement of said support to actuate said two-way valve alternately to automatically connect the proper coolant discharging means with said reservoir to supply coolant to the desired cutting edge of said cutting means against the work during the cutting operation, manually controlled means to independently control the movement of the support and means detachably secured to said means to independently control the supply of coolant against the work.

9. In a machine, in combination, a rotary spindle, a plurality of cutting means mounted thereon, a reciprocating work support mounted thereon adapted to hold pieces of work on opposite ends thereof and to advance them alternately into operative cutting relation to said cutting means, means to automatically change the direction of travel of said support, a plurality of means to supply a coolant to the cutting edge of said respective cutting means against the work and means controlled by the movement of the support alternately to automatically supply said coolant to the desired cutting side of said respective cutting means and to automatically shut off the supply of coolant from the opposite side as desired, manually controlled means to independently control the movement of said support and means controlled by said means to independently control the supply of coolant to said respective cutting means.

10. In a machine, in combination, rotary cutting means mounted thereon, a reciprocating work support mounted thereon adapted to hold pieces of work on opposite ends thereof and to advance the piece on each respective end thereof alternately into operative cutting relation to said cutting means, means to change the direction of travel of said support, a plurality of means to discharge a coolant on the cutting edge of said cutting means against the work, a coolant supply reservoir, means connecting said supply reservoir to each respective coolant discharging means including a two-way valve, a pivoted closure arm adapted to alternately close the respective coolant discharging means connecting orifices of the two-way valve and means controlled by the movement of said support to actuate said pivoted closure arm to alternately connect the proper coolant discharging means with said reservoir to supply coolant to the desired cutting edge of said cutting means against the work during the cutting operation.

11. In a machine, in combination, rotary cutting means mounted thereon, a reciprocating work support mounted thereon adapted to hold pieces of work on opposite ends thereof and to advance the piece on each respective end thereof alternately into operative cutting relation to said cutting means, means to automatically change the direction of travel of said support, a plurality of means to discharge a coolant on the cutting edge of said cutting means against the work, a coolant supply reservoir, means connecting said supply reservoir to each respective coolant discharging means including a two-way valve, a shaft pivoted adjacent to said valve and the rear edge of said travelling work support, a closure arm secured to said shaft adapted to alternately close the respective coolant discharging means connecting orifices of the two-way valve, an operating lever secured to said shaft and extending adjacent to the rear edge of said travelling work support and horizontally adjustable dogs projecting from the rear edge of said travelling work support adapted to contact said operating lever to actuate said closure arm to alternately connect the proper coolant discharging means with said reservoir to supply coolant from the relative cutting edge of said cutting means against the work during the cutting operation, and means to raise up said operating lever after depression thereof by said dogs to the path of said dogs so as to be contacted by the proper dog during the next movement of the support.

12. In a machine, in combination, rotary cutting means mounted thereon, a reciprocating work support mounted thereon adapted to hold pieces of work on opposite ends thereof and to advance the piece on each respective end thereof alternately into operative cutting relation to said cutting means, means to automatically change the direction of travel of said support, a plurality of means to discharge a coolant to the cutting edge of said cutting means against the work, a coolant supply reservoir, means connecting said supply reservoir to each respective coolant discharging means including a two-way valve, a shaft pivoted adjacent to said valve and the rear edge of said travelling work support, a closure arm secured to said shaft adapted to alternately close the respective coolant discharging means connecting orifices of the two-way valve, an operating lever secured to said shaft and extending adjacent to the rear edge of said travelling work support and horizontally adjustable dogs projecting from the rear edge of said travelling work support adapted to contact said operating lever to actuate said closure arm to alternately connect the proper coolant discharging means with said reservoir to supply coolant to the desired cutting edge of said cutting means against the work, during the cutting operation, manually controlled means to independently control the movement of the support and a link detachably connecting said means and said shaft to, conjointly with movement of said means, pivot said shaft to independently actuate said closure arm to independently connect the respective coolant discharging means with said reservoir to control the coolant supply.

13. In a machine, in combination, rotary cutting means mounted thereon, a reciprocating work support mounted thereon adapted to hold pieces of work on opposite ends thereof and to advance the piece on each respective end thereof alternately into operative cutting relation to said cutting means, means to automatically change the direction of travel of said support, a plurality of means to discharge a coolant to the cutting edge of said cutting means against the work, a coolant supply reservoir, means connecting said supply reservoir to each respective coolant discharging means including a two-way valve, a shaft pivoted adjacent to said valve and the rear edge of said travelling work support, a closure arm secured to said shaft adapted to alternately close the respective coolant discharging means connecting orifices of the two-way valve, an operating lever secured to said shaft and extending adjacent to the rear edge of said travelling work support and horizontally adjustable dogs projecting from the rear edge of said travelling work support adapted to contact said operating lever to actuate said closure arm to alternately connect the proper coolant discharging means with said reservoir to supply coolant to the desired cutting edge of said cutting means against the work during the cutting operation and means to raise up said operating lever after depression thereof by said dogs to the path of said dogs so as to be contacted by the proper dog during the next movement of the support, manually controlled means to independently control the movement of the support and a link detachably connecting said means and said shaft to, conjointly with movement of said means, pivot said shaft to independently actuate said closure arm to independently connect the respective coolant discharging means with said reservoir to control the coolant supply.

In testimony whereof I affix my signature.

BENJAMIN P. GRAVES.